Sept. 12, 1967 N. E. COTT 3,341,178
SINGLE-THROW LEVER TOOL FOR JOINING FLANGED SPLIT-BAND ELEMENTS
Filed June 28, 1966 2 Sheets-Sheet 1
Fig. 1
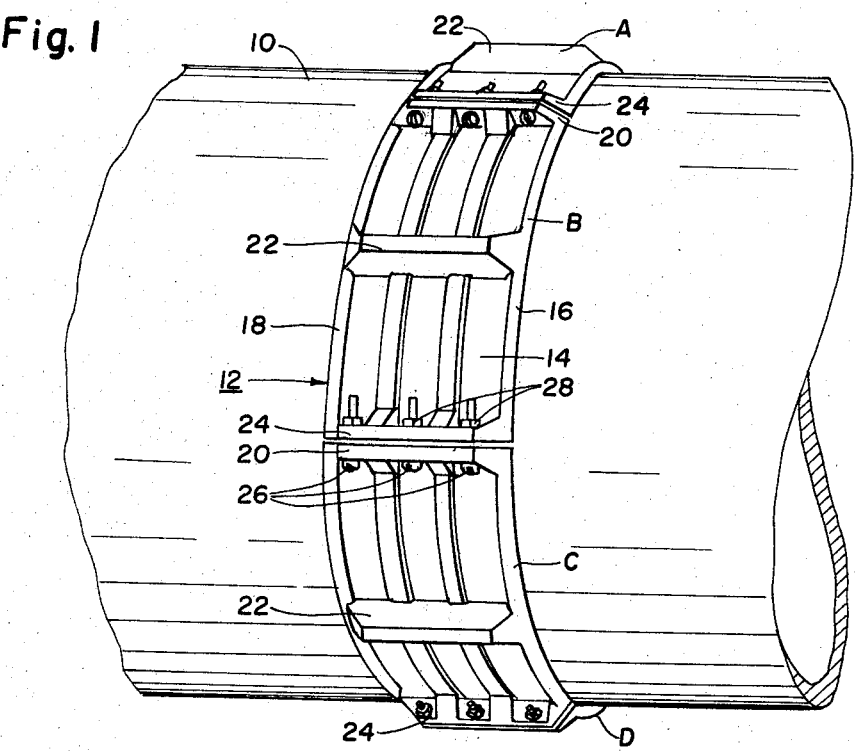
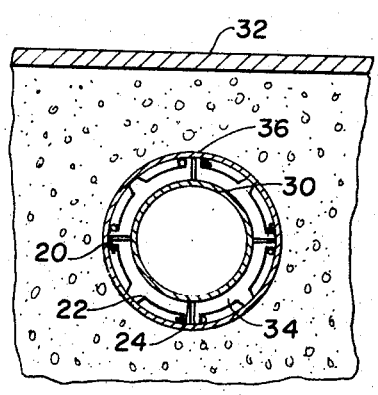
Fig. 2
Fig. 3
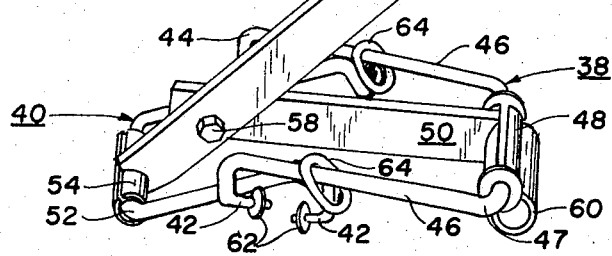
INVENTOR
NORRIS E. COTT
BY
ATTORNEY Sept. 12, 1967  N. E. COTT  3,341,178
SINGLE-THROW LEVER TOOL FOR JOINING FLANGED SPLIT-BAND ELEMENTS
Filed June 28, 1966  2 Sheets-Sheet 2
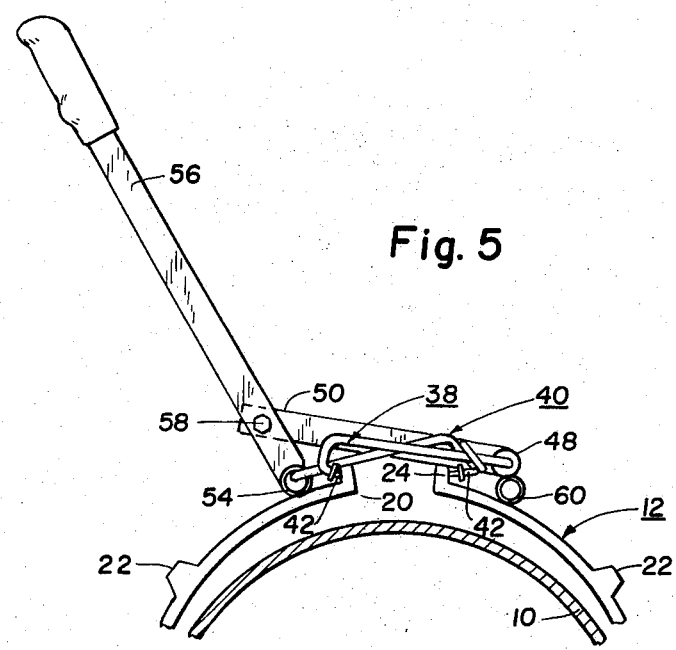
Fig. 5
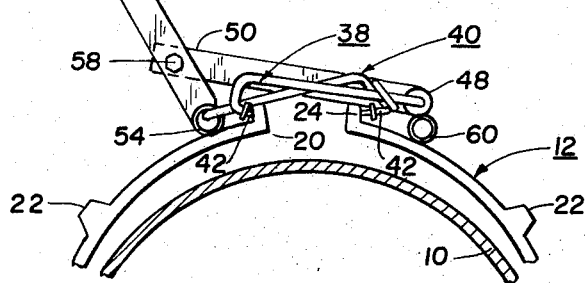
Fig. 4
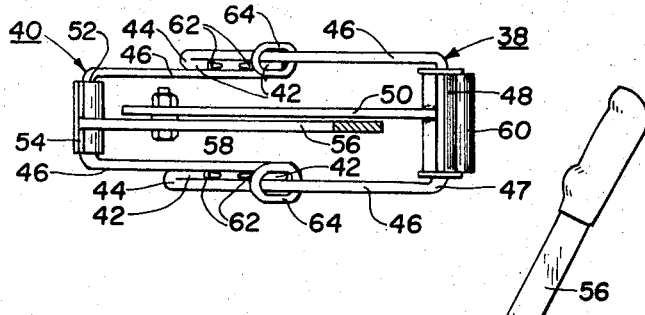
Fig. 6
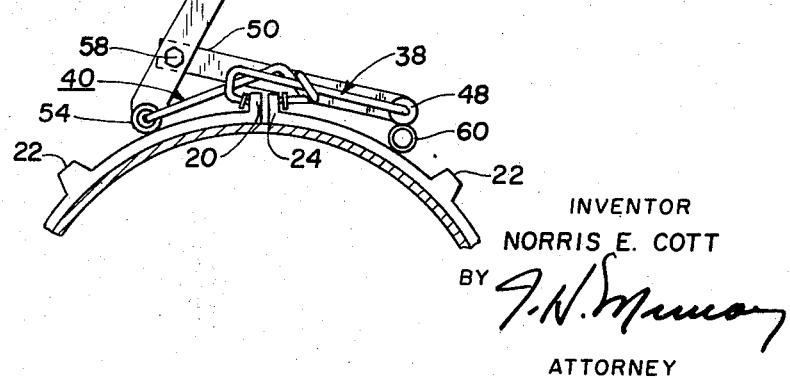
INVENTOR
NORRIS E. COTT
BY
ATTORNEY 3,341,178
SINGLE-THROW LEVER TOOL FOR JOINING
FLANGED SPLIT-BAND ELEMENTS
Norris E. Cott, 3201 Mayflower Drive,
Pittsburgh, Pa. 15227
Filed June 28, 1966, Ser. No. 561,233
6 Claims. (Cl. 254—79)

This invention relates to a pliers-type clamping or tensioning tool, and more particularly to a tensioning tool for securing split-band elements around a tubular member.

While not limited thereto, the present invention is particularly adapted for use in securing pipe liner rings, sometimes called casing insulator rings, around a tubular conduit or pipe. When a pipeline passes beneath a highway, road or other area where excessive compressive forces are encountered, it is necessary to surround the pipeline itself by an outer tubular casing. The function of the casing, of course, is to give added strength and to insure that the pipeline itself will not fracture under the heavy compressive stresses encountered.

Furthermore, the pipeline, as it passes through the casing, must be surrounded by circular bushings or pipe liner rings which serve to center the pipeline within the outer casing and insulate it therefrom. In other cases, such liner rings are used as bearings to facilitate insertion of a pipe into an existing, larger-diameter pipeline.

In the usual case, the pipe liner rings are formed from arcuate sections of plastic material such as high density polyethylene, each section having flanged ends which are bolted together to form a complete ring. The liner ring, when assembled from the aforesaid arcuate sections, is quite tough and inflexible. Consequently, it is often difficult to join the ends of a split ring formed from such sections, particularly in the case of large-diameter pipe. That is, while it is easy to join one arcuate section to the next section when the ring is being formed, the last joint in the thus-formed ring is exceedingly difficult to make, particularly when it is remembered that the flanges on the opposing ends of the split ring must first be squeezed together; bolts passed through holes in the flanges; and nuts thereafter threaded onto the bolts. For that matter, in the past, a large number of man-hours have been expended in securing the flanged ends of the split ring together; and this, of course, is a costly and time-consuming process.

Accordingly, as one object, the present invention seeks to provide a tool which overcomes the above and other difficulties previously encountered in attempting to secure liner rings about pipes or other tubular members.

More specifically, an object of the invention is to provide a tool of the type described wherein the ends of a split pipe liner ring may be brought into close abutting relationship where bolts can easily be passed through holes in opposing flanges by means of arcuate movement of a single lever element, and this notwithstanding the fact that the arcuate sections from which the liner rings are formed are tough and relatively inflexible.

The above and other objects and features of the invention will become apparent from the following detailed description taken in connection with the accompanying drawings which form a part of this specification, and in which:

FIGURE 1 is a perspective view of a pipe or conduit having a pipe liner ring secured around its periphery;

FIG. 2 illustrates the manner in which the liner ring serves to center a pipe or conduit within an outer, larger-diameter pipeline;

FIG. 3 is a perspective view of the clamping tool of the invention;

FIG. 4 is a top view of the clamping tool shown in FIG. 3;

FIG. 5 illustrates one position of the clamping tool of the invention prior to the ends of the pipe liner ring being squeezed together; and FIG. 6 illustrates a second position of the tool of the invention after the flanged ends of the liner ring have been brought together into close, abutting relationship.

With reference now to the drawings, and particularly to FIG. 1, a pipe or tubular conduit 10 is shown having a pipe liner ring, generally indicated by the reference numeral 12, secured around its periphery. As shown, the pipe liner ring is formed from arcuate sections of tough plastic material such as high density polyethylene, four of said sections being shown in FIG. 1 and identified as A, B, C and D. Each arcuate section comprises a base portion 14, the inner side of which is flat and in abutment with the periphery of the pipe 10. At the edges of the flat portion 14 are arcuate beaded portions 16 and 18; and between the beaded portions 16 and 18 are three radially-outwardly extending flanges 20, 22 and 24. The flanges 20 and 24 at the ends of each arcuate section are, in effect, one-half of a complete flange and form a complete flange with the corresponding one-half flange on the next arcuate section. The flanged portions 20 and 24 on the abutting ends of the arcuate sections B and C, for example, are secured together by means of bolts 26 which pass through openings in the flanges 20 and 24 and have nuts 28 threadedly received thereon. In applying the liner ring 12 to a pipe 10, the nuts 28 of all joints are not drawn up tight until the last joint is made. Normally, the flanged portions 20 and 24 will be spaced apart by about one-half to three-quarters of an inch, even when the nuts are drawn up tight. This variable spacing between arcuate sections accommodates coating of various thickness which, in turn, vary the outside diameter of the pipe.

A typical application for such liner rings is shown in FIG. 2 wherein the pipeline 30 passes beneath a roadway 32, for example. The liner ring 34 itself surrounds the outer periphery of the pipeline 30 and is in abutting relationship therewith. The flanges 20, 22 and 24, for example, on each arcuate section of the liner ring 34 are in abutment with the inner periphery of an outer pipe 36 of larger diameter. In this respect, the outer pipe 36 prevents crushing of the inner pipe 30 under compressive forces while the liner ring 34 serves to center and insulate the pipeline 30 within the outer pipe 36.

As was explained above, the arcuate sections from which the pipe liner rings are formed are relatively tough and inflexible. While such sections can be readily assembled together before a complete ring is formed, the last junction between the opposing flanged ends of the resulting split ring is exceedingly difficult to make. In the past, an attempt has been made by workmen in the field to squeeze the one-half flange portions 20 and 24 of FIG. 1, for example, together and thereafter pass the bolts 26 through the holes provided in the flanges. Thereafter, it was necessary to thread the nuts onto the bolts. Needless to say, this is a very difficult process, particularly when it is remembered that the plastic from which the liner ring is made is relatively tough and inflexible.

The clamping or tensioning tool of the present invention for forcing the flanged ends of the split liner ring together around a pipe or conduit 10 is shown in FIGS. 3, 4, 5 and 6. It comprises two generally U-shaped hooks 38 and 40, each half of both hooks comprising a first relatively short portion 42 adapted to fit into an opening in a flange on the end of the split liner ring member, a second relatively short portion 44 at right angles to the first portion, and a long third shank portion 46 which is parallel to the first portion 42. The shank portions 46 on either side of the U-shaped hook 38, for example, are interconnected by means of a transverse portion 47 which passes through a tubular bearing 48 connected, preferably by welding, to a linkage 50. With this construction, the U-shaped hook 38 may rotate within the tubular bearing 48.

In a similar manner, the shank portions 46 of the U-shaped hook 40 are interconnected by means of a transverse portion 52 which passes through a tubular bearing 54. The tubular bearing 54 is welded to an elongated handle 56, the handle 56 being pivotally connected to the linkage 50 as at 58. The assembly is completed by a tubular portion 60 which serves as a bearing support during the clamping operation as will hereinafter be described. Washers 62 surrounding the short portions 42 of the respective hooks 38 and 40 serve to limit the degree of penetration of portions 42 into openings provided in opposing flanges. Separation of the two U-shaped hooks 38 and 40 is prevented by passing the shank portions 46 on hook 38, for example, through eyelets 64 welded to portions 44 on the hook 40.

In the operation of the device, it will be appreciated that if the handle 56 is rotated about the axis of tubular bearing 54 in a counterclockwise direction as viewed in FIG. 3, the two tubular bearings 48 and 54 will be drawn together. At the same time, the short portions 42 on the respective U-shaped hooks 38 and 40 will be forced apart. This position of the tool is shown in FIG. 4. With the short portions 42 thus separated, they may be inserted into openings provided in opposing flanges 20 and 24, for example, of a split liner ring 12 formed from sections such as those shown in FIG. 1. Note that the tubular bearing 54 rests on one arcuate section of the liner ring; whereas the tubular member 60 secured to the underside of bearing 48 rests on the opposing arcuate section.

With the tool in the position shown in FIG. 5, and assuming that the handle 56 is now rotated in a clockwise direction about the tubular bearing 54, the short portions 42 on the opposing U-shaped hooks 38 and 40 will be drawn together while the tubular bearings 54 and 48 are forced apart. At the same time, the tubular bearing 54 and the tubular member 60 are forced downwardly into engagement with the opposing arcuate sections of the liner ring. After the opposing ends of the split liner ring are thus forced together as shown in FIG. 6, a bolt may be passed through the center opening of the two opposing flanges and a nut threaded onto its end to hold the flanges in engagement. Thereafter, the handle 56 will be rotated again in a counterclockwise direction to remove the clamping tool and the remaining two bolts inserted through the appropriate openings and nuts threaded thereon.

It can be seen, therefore, that the tool of the invention eliminates the difficulty previously encountered in attempting to secure the opposing flanges of split liner rings together. Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A clamping tool for forcing flanged ends of a split-ring member into close abutting relationship where they may be fastened together, comprising first generally C-shaped hook means having a first relatively short portion adapted to fit into an opening in a flange on an end of the split-ring member on the side of the flange opposite the opposing end of the split ring, said first hook means also having a second relatively short portion at generally right angles to the first portion and a long third shank portion generally parallel to the first portion, second generally C-shaped hook means having a first relatively short portion adapted to fit into an opening in a flange on the other end of the split-ring member on the side of said last-mentioned flange opposite the first-mentioned flange, said second hook means also having a second relatively short portion at right angles to its first portion and a relatively long third shank portion parallel to the first portion, the shank portions of the first and second hook means being crossed, a handle member pivotally connected to the end of the shank portion of the first hook means opposite said first portion, and a linkage pivotally connected at its opposite ends to the handle member and the end of the shank portion of the second hook means opposite said first portion, the arrangement being such that rotation of the handle member in one direction about its connection to the first hook means will draw the first portions of the hook means together while rotation in the opposite direction will cause the first portions to separate.

2. The clamping tool of claim 1 wherein said linkage is longer than the distance between the pivotal connection of the handle to the first hook means and the pivotal connection of the linkage to the handle.

3. The clamping tool of claim 1 wherein the first portion of each hook means is surrounded by an annular washer which limits the amount of penetration of the first portion into an opening in an associated flanged end on the split-ring member.

4. The clamping tool of claim 1 wherein each hook means includes two first portions, two second portions, and two shank portions, the ends of the shank portions opposite said second portions being interconnected.

5. The clamping tool of claim 4 including eyelets secured to the second portions of one of said hook means and through which the shank portions of the other hook means passes to prevent separation of the two.

6. The clamping tool of claim 4 wherein the respective shank portions of each hook means are interconnected by a fourth portion extending perpendicular to the shank portions, separate tubular bearing means surrounding each of the fourth portions and to which said handle and linkage are respectively connected, and a tubular member secured to the underside of one of said tubular bearing means so as to be in abutment with said split-ring member as the flanged ends of the split-ring member are forced into close abutting relationship.

References Cited

UNITED STATES PATENTS

| | | | |
|---|---|---|---|
| 312,704 | 2/1885 | Carpinter | 254—79 |
| 1,317,145 | 9/1919 | Skantz | 254—77 X |
| 2,590,150 | 3/1952 | Brugmann | 29—267 X |
| 2,787,442 | 4/1957 | Lewis | 254—79 |
| 3,108,783 | 10/1963 | Foust et al. | 254—67 |

WILLIAM FELDMAN, *Primary Examiner.*

M. S. MEHR, *Assistant Examiner.*